(12) United States Patent
Seok et al.

(10) Patent No.: US 12,211,994 B2
(45) Date of Patent: Jan. 28, 2025

(54) ELECTRODE AND LITHIUM SECONDARY BATTERY COMPRISING SAME

(71) Applicant: SAMSUNG SDI CO., LTD., Yongin-si (KR)

(72) Inventors: Hoon Seok, Yongin-si (KR); Juhye Bae, Yongin-si (KR); Wongi Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 545 days.

(21) Appl. No.: 17/424,148

(22) PCT Filed: Jan. 31, 2020

(86) PCT No.: PCT/KR2020/001488
§ 371 (c)(1),
(2) Date: Jul. 19, 2021

(87) PCT Pub. No.: WO2020/159284
PCT Pub. Date: Aug. 6, 2020

(65) Prior Publication Data
US 2022/0109143 A1 Apr. 7, 2022

(30) Foreign Application Priority Data

Feb. 1, 2019 (KR) ............ 10-2019-0013757
Jan. 30, 2020 (KR) ............ 10-2020-0011357

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/623* (2013.01); *H01M 10/0525* (2013.01);
(Continued)

(58) Field of Classification Search
CPC .... H01M 4/0404; H01M 4/366; H01M 4/621; H01M 4/622; H01M 4/623;
(Continued)

(56) References Cited

U.S. PATENT DOCUMENTS 6,045,947 A 4/2000 Shindo et al.
2017/0025230 A1 1/2017 Kinpara et al.
(Continued)

FOREIGN PATENT DOCUMENTS

EP 2797142 A1 10/2014
EP 3343675 A1 7/2018
(Continued)

OTHER PUBLICATIONS

International Search Report dated May 8, 2020, for corresponding PCT/KR2020/001488, 3 pages.
(Continued)

*Primary Examiner* — Matthew W Van Oudenaren
(74) *Attorney, Agent, or Firm* — Lewis Roca Rothgerber Christie LLP

(57) ABSTRACT

Provided an electrode for secondary batteries, the electrode including: a substrate; and a plurality of active material layers arranged on the substrate and each including an active material, wherein at least one of the plurality of active material layers includes a binder, and a content of the binder is about 1.0 part by weight to about 1.7 parts by weight based on 100 parts by weight of a total weight of the plurality of active material layers.

8 Claims, 10 Drawing Sheets

UPPER LAYER

LOWER LAYER

DOUBLE LAYER COATING

(51) Int. Cl.
  *H01M 4/04*     (2006.01)
  *H01M 4/62*     (2006.01)
  *H01M 10/0525*  (2010.01)
  *H01M 10/0583*  (2010.01)
  *H01M 10/0585*  (2010.01)
  *H01M 10/0587*  (2010.01)

(52) U.S. Cl.
  CPC ............... *H01M 2004/021* (2013.01); *H01M 2004/027* (2013.01); *H01M 2004/028* (2013.01); *H01M 4/0404* (2013.01); *H01M 4/621* (2013.01); *H01M 4/622* (2013.01); *H01M 10/0583* (2013.01); *H01M 10/0585* (2013.01); *H01M 10/0587* (2013.01)

(58) Field of Classification Search
  CPC ..... H01M 2004/021; H01M 2004/027; H01M 2004/028; H01M 10/052; H01M 10/0525; H01M 10/0583; H01M 10/0585; H01M 10/0587
  See application file for complete search history.

(56) References Cited

U.S. PATENT DOCUMENTS

| | | | |
|---|---|---|---|
| 2017/0125788 A1 | 5/2017 | Ahn et al. | |
| 2017/0263927 A1* | 9/2017 | Kim | H01M 4/366 |
| 2018/0205064 A1* | 7/2018 | Lee | H01M 4/622 |
| 2018/0226681 A1* | 8/2018 | Hasegawa | H01M 10/052 |
| 2018/0287133 A1* | 10/2018 | Tazoe | H01M 4/669 |
| 2018/0301740 A1* | 10/2018 | Min | H01M 4/131 |
| 2019/0027740 A1* | 1/2019 | Lee | H01M 4/62 |

FOREIGN PATENT DOCUMENTS

| | | | |
|---|---|---|---|
| JP | 9-134718 A | | 5/1997 |
| JP | 10-270013 A | | 10/1998 |
| JP | 2008-258055 A | | 10/2008 |
| JP | 2013-201125 A | | 10/2013 |
| KR | 10-2014-0095980 A | | 8/2014 |
| KR | 10-2014-0137660 A | | 12/2014 |
| KR | 10-1672750 B1 | | 11/2016 |
| KR | 10-2017-0075963 A | | 7/2017 |
| KR | 20170075963 | * | 7/2017 |

OTHER PUBLICATIONS

EPO Extended European Search Report dated Apr. 6, 2023, issued in corresponding European Patent Application No. 20749163.0 (8 pages).

Korean Office Action dated Nov. 19, 2024, issued in corresponding Korean Patent Application No. 10-2020-0011357 (7 pages).

* cited by examiner

DOUBLE LAYER COATING

ELECTRODE AND LITHIUM SECONDARY BATTERY COMPRISING SAME

CROSS-REFERENCE TO RELATED APPLICATION(S)

This application is a U.S. National Phase Patent Application of PCT/KR2020/001488, filed Jan. 31, 2020, which claims priority to Korean patent application 10-2019-0013757, filed on Feb. 1, 2019, and Korean patent application 10-2020-0011357, filed on Jan. 30, 2020, the entire content of each of which is hereby incorporated by reference.

TECHNICAL FIELD

The present disclosure relates to an electrode and a secondary battery including the same.

BACKGROUND ART

Lithium secondary batteries are used as power sources for driving portable electronic appliances such as video cameras, mobile phones, and notebook computers. Rechargeable lithium secondary batteries have three times higher energy density per unit weight than known lead batteries, nickel-cadmium batteries, nickel metal hydride batteries, and nickel-zinc batteries, and may be charged at high speed.

A lithium secondary battery produces electrical energy by oxidation and reduction reactions occurring when lithium ions are intercalated/desorbed in a state of charging an electrolyte between a cathode and an anode including active materials capable of intercalating and desorbing lithium ions.

Each of the cathode and the anode is formed by mixing an active material, a binder, and a solvent to obtain an active material slurry, applying the active material slurry to the surface of a current collector and then drying the applied active material slurry. Meanwhile, in the process of drying the active material slurry, there exists a problem that a binder move toward an electrode interface by binder migration. As a result, adhesion force between the current collector and the active material layer decreases, resistance on the upper interface of the active material layer increases, the electrodes deteriorate, and battery characteristics at a high rate deteriorates.

In order to solve the above problem, a method of controlling the conditions of the drying process has been proposed, but no fundamental solution has yet been reported.

Thus, a novel electrode capable of increasing adhesion force between an electrode and an active material layer and decreasing resistance on the outer interface of the active material layer, and a manufacturing method thereof are required.

DESCRIPTION OF EMBODIMENTS

Technical Problem

An aspect is to provide a novel electrode capable of increasing adhesion force between an active material layer and a substrate and decreasing resistance on the outer interface of the active material layer.

Another aspect is to provide a method of manufacturing the novel electrode.

Another aspect is to provide a secondary battery including the novel electrode.

Solution to Problem

According to an aspect, there is provided an electrode for secondary batteries, the electrode including: a substrate; and a plurality of active material layers arranged on the substrate and each including an active material, wherein at least one of the plurality of active material layers includes a binder, and a content of the binder is about 1.0 part by weight to about 1.7 parts by weight based on 100 parts by weight of a total weight of the plurality of active material layers.

According to an aspect, there is provided a method of preparing an electrode for secondary batteries, the method including: preparing a plurality of active material slurries each including an active material or an active material and a binder; and applying the plurality of active material slurries onto a substrate to form a plurality of active material layers, wherein a content of the binder is about 1.0 part by weight to about 1.7 parts by weight based on 100 parts by weight of a total weight of the plurality of active material layers.

According to an aspect, there is provided a secondary battery including the above-described electrode for secondary batteries.

Advantageous Effects of Disclosure

According to an aspect, an electrode for secondary batteries includes: a substrate; and a plurality of active material layers arranged on the substrate and each including an active material, wherein at least one of the plurality of active material layers includes a binder, and a content of the binder is about 1.0 part by weight to about 1.7 parts by weight based on 100 parts by weight of a total weight of the plurality of active material layers. Therefore, a secondary battery including the electrode has long lifetime and charge-discharged characteristics at high rates.

EXPLANATION OF SYMBOLS FOR MAIN PARTS IN THE DRAWINGS

Figure 1:
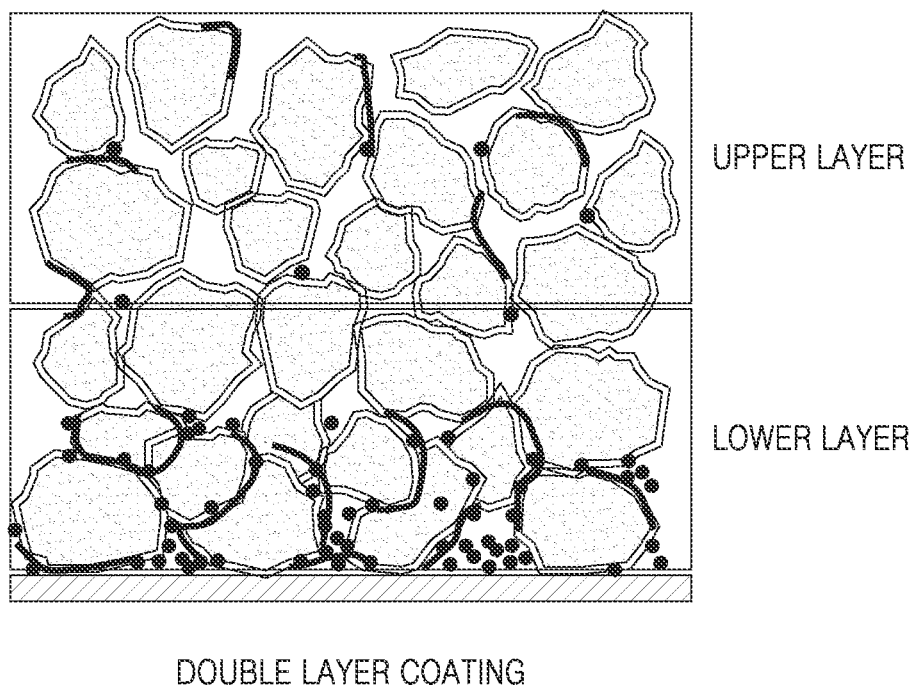
FIG. 1 is a schematic cross-sectional view of an electrode.

1: Lithium battery 2: Anode
3: Cathode 4: Separator
5. Battery case 6: Cap assembly

MODE OF DISCLOSURE

The present inventive concept to be described below can apply various transformations and can have various embodiments, so specific embodiments are illustrated in the drawings and described in detail in the detailed description. However, this is not intended to limit the present inventive concept to a specific embodiment, and should be understood to include all transformations, equivalents or substitutes included in the technical scope of the present inventive concept.

The terminology used herein is for the purpose of describing particular embodiments only and is not intended to be limiting of the inventive concept. The singular forms are intended to include the plural forms as well, unless the context clearly indicates otherwise. As used herein, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. Throughout the specification, when an element such as a layer, a film, a region or a component is referred to as being "on" another layer or element, it can be "directly on" the other layer or element, or intervening layers, regions, or components may also be present. Throughout the specification, although the terms "first", "second", etc., may be used herein to describe various components, these components, should not be limited by these terms. These terms are used only to distinguish one component from another, not for purposes of limitation. Although some of the components may be omitted in the drawings, this is to aid the understanding of features of the invention and is not intended to exclude the omitted components.

In the present specification, the term "mixture layer" refers to a layer formed by physically or chemically mixing one or more different materials.

Hereinafter, electrodes, secondary batteries including electrodes, and methods of manufacturing the electrodes according to embodiments will be described in detail.

An electrode for secondary batteries according to an embodiment includes: a substrate; and a plurality of active material layers arranged on the substrate and each including an active material, wherein at least one of the plurality of active material layers includes a binder, and a content of the binder is about 1.0 part by weight to about 1.7 parts by weight based on 100 parts by weight of a total weight of the plurality of active material layers.

In the electrode including the plurality of active material layers, the content of the binder is easily adjusted as compared with an electrode including a single active material layer. In the case of the electrode including a single active material layer, in the process of drying an active material slurry, the binder is moved to the interface of the active material layer by binder migration, and thus the content of the binder in a region adjacent to the substrate decreases, and as a result, adhesion force between the substrate and the active material layer may deteriorate. This problem may be solved to some extent by including a large amount of a binder in the active material slurry. However, in this case, the concentration of the binder in the interface of the active material layer increases, and thus high rate charge-discharge characteristics may deteriorate due to the increase of interfacial resistance. Accordingly, in the electrode including a single active material layer, although the content of the binder is required to decrease in terms of high-rate charge characteristics, the content of the binder is required to increase in terms of improvement of adhesion force with the substrate, so that there is a difficulty in simultaneously achieving the improvement of both high-rate charge characteristics and adhesion force.

Meanwhile, since the electrode for secondary batteries according to an embodiment includes a plurality of active material layers, it is easy to adjust the content of the binder content in each active material layer. As a result, it is possible to prepare an electrode for secondary batteries that have excellent adhesion adhesive to the substrate and have low interfacial resistance despite containing a small amount of a binder, that is, 1.0 part by weight to 1.7 parts by weight of a binder based on 100 parts by weight of the total weight of the plurality of active material layers.

A secondary battery including such an electrode has improved charge-discharge characteristics at high rate, has excellent adhesion between a substrate and an active material layer to improve conductivity and inhibit the detachment of the active material layer, thereby improving lifetime characteristics.

The plurality of active material layers may include two or more active material layers. According to an embodiment, the plurality of active material layers may include three or more active material layers, but the present disclosure is not limited thereto.

The two or more active material layers may include binders of the same or different types. According to an embodiment, the two or more active material layers may include the same binder as each other. According to another embodiment, the two or more active material layers may include different types of binders. The type of the binder will be described later.

According to an embodiment, any one of the two or more active material layers may include a binder, and the other layer may not include a binder. Among the two or more active material layers, the active material layer disposed to be in direct contact with the substrate includes a binder, and the other active material layer does not include a binder. Therefore, the binding force between the active material layer and the substrate may be secured, and the resistance of lithium ions during movement may be lowered by removing the binder from an electrode interface, thereby making high-speed charging and discharging easier.

According to another embodiment, the two or more active material layers may include different amounts of binders, respectively. For example, among the two or more active material layers, the active material layer in direct contact with the substrate may have the highest binder content.

The binder included in the plurality of active material layers may be non-uniformly distributed in the active material layers. According to an embodiment, the binder may be present locally in the active material layer. For example, when the binder is locally present in a region adjacent to the substrate in the active material layer, adhesion force between the active material layer and the substrate may be improved. Specifically, the binder may be locally present in a region corresponding to a thickness of about 80% from the substrate, more specifically, a region corresponding to a thickness of about 35% from the substrate with respect to the entire thickness of the active material layer. For example, when the total thickness of the active material layer is 100 μm, the binder may be locally distributed only up to a thickness of 80 μm from the substrate.

The substrate may include an electroconductive substrate, and the binder may have a concentration gradient that decreases as a distance from the substrate increases. The substrate may include a material having electrical conductivity, for example, a metal plate such as a copper plate or an aluminum plate. As the concentration of the binder is highest near the substrate and lowest at the interface of an electrode in contact with an electrolyte, the adhesion force between the active material layer and the substrate may be improved, and at the same time, the interfacial resistance may be lowered.

The plurality of active material layers may include a first active material layer and a second active material layer, the second active material layer may be disposed between the substrate and the first active material layer, and the second active material layer may include a binder.

According to an embodiment, a second active material layer may be disposed on the substrate, and a first active material layer may be disposed on the second active material layer. For example, the substrate and the second active material layer may be disposed to be in direct contact with each other. From this layer structure, the second active material layer and the substrate may be firmly coupled to each other by the binder included in the second active material layer.

According to another embodiment, an intermediate layer for improving adhesiveness between the second active material layer and the substrate may be included. The material of the intermediate layer may be used without limitation as long as it is a material that strongly couples the second active material layer and the substrate and does not inhibit the flow of electrons.

The first active material layer and the second active material layer may include a binder in a weight ratio of more than 5:5 and 0:10 or less. In this case, when the weight ratio of the binder in the first active material layer and the second active material layer is 0:10, it means that the first active material layer does not include a binder, and only the second active material layer includes the binder in an amount of 1.0 part by weight to 1.7 parts by weight based on the total weight of the active material layer.

According to an embodiment, the first active material layer may further include a first binder, and the second active material layer may further include a second binder.

For example, the first active material layer and the second active material layer may include a binder in a weight ratio of more than 5:5 to 1:9 or less, 4:6 to 1:9, or more than 4:6 to 2:8 or less.

According to an embodiment, the content of the second binder may be higher than the content of the first binder. When the content of the second binder is higher than the content of the first binder, sufficient adhesion force between the substrate and the active material layer may be secured. Further, when the content of the first binder is lower than the content of the second binder, the interfacial resistance of the active material layer may be lowered to improve the high-speed charge-discharge characteristics.

The content of the first binder may be 1.5 parts by weight or less based on 100 parts by weight of the total content of the first active material layer. For example, the content of the first binder may be more than 0 parts by weight and 1.5 parts by weight or less, 0.3 parts by weight to 1.2 parts by weight, or 0.4 parts by weight to 1.1 parts by weight based on 100 parts by weight of the total content of the first active material layer.

The content of the second binder may be 1 part by weight to 3 parts by weight based on 100 parts by weight of the total content of the second active material layer. For example, the content of the second binder may be 1 part by weight to 2.5 parts by weight, 1.5 parts by weight to 2.5 parts by weight, 1.8 parts by weight to 2.7 parts by weight, or 1.8 parts by weight to 2.4 parts by weight based on 100 parts by weight of the total content of the second active material layer.

When the contents of the first and second binders are within the above ranges, strong binding between the second active material layer and the substrate may be expected, an increase in interfacial resistance may be suppressed, and strong binding may be expected even between the first active material layer and the second active material layer.

Each of the thicknesses of the first active material layer and the second active material layer may be 60 μm to 210 μm, and the thicknesses of the first active material layer and the second active material layer may be the same as or different from each other. According to an embodiment, the thickness of the first active material layer may be greater than the thickness of the second active material layer. As the thickness of the second active material layer decreases compared to the thickness of the first active material layer, it is easier to control the movement of the binder upward (that is, binder migration) during the formation of the active material layer. Further, as the thickness of the first active material layer increases compared to the thickness of the second active material layer, there are effects that the porosity of the first active material layer increases, and a pore structure is well developed, so that the mobility of lithium ions (that is, lithium-ion conductivity) is improved.

The thickness of the first active material layer may be 100 μm to 210 μm. For example, the thickness of the first active material layer may be 110 μm to 200 μm, 120 μm to 190 μm, 130 μm to 180 μm, 140 μm to 170 μm, or 150 μm to 160 μm, but is not limited thereto.

The thickness of the second active material layer may be 60 μm to 150 μm. For example, the thickness of the second active material layer may be 70 μm to 140 μm, 80 μm to 130 μm, 90 μm to 120 μm, or 100 μm to 110 μm, but is not limited thereto.

When the thickness of the second active material layer satisfies the above range, strong binding between the active material layer and the substrate is possible. Further, when the thickness of the first active material layer satisfies the above range, the movement of the binder to the interface of the first active material layer may decrease, thereby suppressing an increase in the interface resistance.

The thickness ratio of the first active material layer and the second active material layer may be 7:3 to 5:5. For example, the thickness ratio of the first active material layer and the second active material layer may be 7:3, 6:4, or 5:5, but is not limited thereto. When the thickness ratio of the first active material layer and the second active material layer satisfies the above range, strong binding between the substrate and the second active material layer may be formed, and the first active material layer and the second active material layer, and the content of the binder on the upper surface of the first active material layer may be minimized to suppress an increase in the interfacial resistance. As the thickness ratio of the first active material layer increases from 50% to 70%, a diffusion distance of the binder from the first active material layer to the interface increases, which is effective in suppressing the movement of the binder. Meanwhile, when the thickness ratio of the second active material layer is less than 30%, it is difficult to bind the second active material layer on the substrate.

The thickness of the electrode for secondary batteries may be 200 μm to 300 μm. Further the electrode for secondary batteries may be a cathode or an anode.

Hereinafter, a method of manufacturing an electrode for secondary batteries according to an embodiment will be described.

A method of preparing an electrode for secondary batteries includes: preparing a plurality of active material slurries each including an active material or an active material and a binder; and applying the plurality of active material slurries onto a substrate to form a plurality of active material layers, wherein a content of the binder is about 1.0 part by weight to about 1.7 parts by weight based on 100 parts by weight of a total weight of the plurality of active material layers.

The plurality of active material slurries includes a first active material slurry and a second active material slurry, the first active material slurry includes a first active material, the second active material slurry includes a second active material, and at least one of the first active material slurry and the second active material slurry includes a binder.

The first active material slurry may further include a first solvent, and the second active material slurry may further include a second solvent.

The first solvent and the second solvent include an organic solvent, water, or a combination thereof. The first solvent and the second solvent may be independently selected from organic solvents such as N-methyl pyrrolidone, dimethyl formamide, acetone, and dimethyl acetamide, water, and combinations thereof.

According to an embodiment, the first active material layer and the second active material layer refer to the above description, and the binder refers to the above description.

According to an embodiment, the process of forming the plurality of active material layers may include: a process of applying the second active material slurry onto the substrate and drying this slurry to form a second active material layer; and a process of applying the first active material slurry onto the second active material layer and drying this slurry to form a first active material layer.

According to another embodiment, the process of forming the plurality of active material layers may include a process of applying the second active material slurry onto the substrate, applying the first active material slurry onto the second active material slurry, and then drying these slurries to form a first active material layer and a second active material layer.

The drying process may be performed by a single drying process or a plurality of drying processes. For example, the plurality of drying processes may be performed at different drying temperatures for each individual drying process.

The drying process may be performed at 70° C. to 120° C. for 4 minutes to 15 minutes. For example, the drying process may be performed at 70° C. to 110° C. for 4 minutes to 10 minutes, but is not limited thereto. The drying process may be performed according to the type and content of the solvent contained in the slurry and may be performed at the temperature and time that does not degrade the active material.

Further, the plurality of drying processes may be performed by selecting an appropriate temperature and time within the above-described time and temperature range.

According to an embodiment, the process of forming of the plurality of active material layers may further include a process of applying the plurality of active material slurries on a substrate, drying these slurries, and then pressing these slurries.

For example, the process of forming the plurality of active material layers may include: a process of applying the second active material slurry onto the substrate and drying this slurry to form a second active material layer; and a process of applying the first active material slurry onto the second active material layer slurry and drying this slurry to form a first active material layer; and a process of simultaneously pressing the first active material layer and the second active material layer.

For example, the process of forming the plurality of active material layers may include: a process of applying the second active material slurry onto the substrate and drying this slurry to form a second active material layer; a process of pressing the second active material layer, a process of applying the first active material slurry onto the second active material layer and drying this slurry to form a first active material layer; and a process of pressing the first active material layer.

According to another embodiment, the process of forming the plurality of active material layers may include a process of simultaneously applying the plurality of active slurries on the substrate, drying these slurries, and then pressing these dried slurries.

For example, the process of forming the plurality of active material layers may include: a process of applying the second active material slurry onto the substrate, applying the first active material slurry onto the second active material slurry, and drying these slurries to form a second active material layer and a first active material layer; and a process of simultaneously pressing the first active material layer and the second active material layer.

The loading amounts of the first active material slurry and the second active material slurry may be the same as or different from each other. For example, the loading amount of the second active material slurry may be smaller than the loading amount of the first active material slurry.

The first active material layer and the second active material layer may have the same thickness or different thicknesses. The thickness of the first active material layer may be thicker than the thickness of the second active material layer.

According to an aspect of another embodiment, a secondary battery including the aforementioned electrode is disclosed. The secondary battery includes, but is not limited to, a lithium secondary battery and a sodium secondary battery, and includes any battery capable of repeatedly providing electricity by charging and discharging For example, the secondary battery includes a cathode and an anode, and at least one of the cathode and the anode may include the electrode according to an embodiment of the present disclosure.

For example, the secondary battery may be manufactured by the following method.

First, a cathode is prepared.

For example, a cathode active material composition in which a cathode active material, a conductive material, a binder, and a solvent are mixed is prepared. A cathode plate is prepared by coating a metal substrate (for example, metal current collector) with the cathode active material composition. Alternatively, the cathode plate may be prepared by casting the cathode active material composition onto a separate support, separating a film from the support and then laminating the separated film on a metal current collector. The cathode is not limited to the above-described form, but may have a form other than the above-described form.

The cathode active material, which is a lithium-containing metal oxide, may be used without limitation as long as it is generally used in the art. As the lithium-containing metal oxide, for example, two or more kinds of composite oxides of lithium and a metal selected from cobalt, manganese, nickel, and combinations thereof may be used. As the lithium-containing metal oxide, for example, a compound represented by any one of Formulae of $Li_aA_{1-b}B^1_bD^1_2$ (where, $0.90 \leq a \leq 1.8$, and $0 \leq b \leq 0.5$ are satisfied); $Li_aE_{1-b}B^1_bO_{2-c}D^1_c$ (where, $0.90 \leq a \leq 1.8$, $0 \leq b \leq 0.5$, and $0 \leq c \leq 0.05$ are satisfied); $LiE_{2-b}B^1_bO_4{-}D^1_c$(where, $0 \leq b \leq 0.5$ and $0 \leq c \leq 0.05$ are satisfied); $Li_aNi_{1-b-c}Co_bB^1_cD^1_\alpha$ (where, $0.90 \leq a \leq 1.8$, $0 \leq b \leq 0.5$, $0 \leq c \leq 0.05$, and $0 \leq \alpha \leq 2$ are satisfied); $Li_aNi_{1-b-c}Co_bB^1_cO_{2-\alpha}F^1_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Co_bB^1_cO_{2-\alpha}F^1_2$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1_cD^1_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Mn_bB^1_cO_{2-\alpha}F^1_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1_cO_{2-\alpha}F^1_2$ (where, $0.90 \leq a \leq 1.8$, $0 \leq b \leq 0.5$, $0 \leq c \leq 0.05$, and $0 < \alpha < 2$ are satisfied); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$ satisfied); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$ are satisfied); $Li_aNiG_bO_2$ (where, $0.90 \leq a \leq 1.8$ and $0.001 \leq b \leq 0.1$ are satisfied); $Li_aCoG_bO_2$ (where, $0.90 \leq a \leq 1.8$ and $0.001 \leq b \leq 0.1$ are satisfied); $Li_aMnG_bO_2$ (where, $0.90 \leq a \leq 1.8$ and $0.001 \leq b \leq 0.1$ are satisfied); $Li_aMn_2G_bO_4$ (where, $0.90 \leq a \leq 1.8$ and $0.001 \leq b \leq 0.1$ are satisfied); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ may be used.

In Formulae above, A is Ni, Co, Mn, or a combination thereof; $B^1$ is Al, Ni, Co, Mn, Cr, Fe, Mg, Sr, V, a rare earth element, or a combination thereof; $D^1$ is O, F, S, P, or a combination thereof; E is Co, Mn, or a combination thereof; $F^1$ is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the lithium-containing metal oxide may be $LiCoO_2$, $LiMn_xO_{2x}$ (x=1,2), $LiNi_{1-x}Mn_xO_{2x}$ ($0<x<1$), $LiNi_{1-x-y}Co_xMn_yO_2$ ($0 \leq x \leq 0.5$, $0 \leq y \leq 0.5$), or $LiFePO_4$.

Also, a compound having a coating layer on the surface of the compound may be used, or a mixture of the compound and a compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any coating method may be used as long as this compound may be coated with such elements by a method that does not adversely affect the physical properties of the cathode active material (for example, spray coating, dipping or the like). This coating method will be understood by those skilled in the art, so that a detailed description thereof will be omitted.

As the conductive material, for example, carbon black, graphite fine particles, or the like may be used, but is not limited thereto. Any conductive material may be used as long as it may be used in the art.

Examples of the binder may include, but are not limited to, a vinylidene fluoride/hexafluoropropylene copolymer, polyvinylidene fluoride (PVDF), polyacrylonitrile, polymethylmethacrylate, polytetrafluoroethylene and mixtures thereof, and a styrene butadiene rubber-based polymer. Any binder may be used as long as it may be used in the art.

As the solvent, N-methylpyrrolidone, acetone, water, or the like may be used, but the present disclosure is not limited thereto. Any solvent may be used as long as it is used in the related technical field.

The content of the cathode active material, the content of the conductive material, the content of the binder, and the content of the solvent are levels commonly used in the lithium secondary battery. The content of the binder is as described above.

When the cathode includes an electrode according to an aspect of the present disclosure, the cathode may be prepared as a cathode including double active material layers using the first cathode active material composition and the second cathode active material composition.

Next, an anode is prepared.

For example, an anode active material composition in which an anode active material, a conductive material, a binder, and a solvent are mixed is prepared. An anode plate is prepared by directly coating a metal current collector with the anode active material composition and drying the anode active material composition. Alternatively, the anode plate may be prepared by casting the anode active material composition onto a separate support, separating a film from the support and then laminating the separated film on a metal current collector.

The anode active material may be used without limitation. Any anode active material may be used as long as it may be used in the art. For example, the anode active material may include at least one selected from a lithium metal, a metal alloyable with lithium, a transition metal oxide, a non-transition metal oxide, and a carbon-based material.

For example, the metal alloyable with lithium may be Si, Sn, Al, Ge, Pb, Bi, Sb, a Si—Y alloy (Y is an alkaline metal, an alkaline earth metal, a group 13 element, a group 14 element, a transition metal, or a combination thereof, not Si), or a Sn—Y alloy (Y is an alkaline metal, an alkaline earth metal, a group 13 element, a group 14 element, a transition metal, or a combination thereof, not Sn). The element Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

For example, the transition metal oxide may be lithium titanium oxide, vanadium oxide, lithium vanadium oxide, or the like.

For example, the non-transition metal oxide may be $SnO_2$, $SiO_x$ ($0<x<2$), or the like.

The carbon-based material may be crystalline carbon, amorphous carbon, or a mixture thereof. The crystalline carbon may be graphite such as natural graphite or artificial graphite of an amorphous, plate-like, flake-like, spherical or fibrous form. The amorphous carbon may be soft carbon (low-temperature fired carbon), hard carbon, mesophase pitch carbide, or fired coke.

The conductive material, binder and solvent in the anode active material composition may be the same as those in the cathode active material composition.

The content of the anode active material, the content of the conductive material, the content of the binder, and the content of the solvent are levels commonly used in the lithium secondary battery. The content of the binder is as described above.

When the anode includes an electrode according to an aspect of the present disclosure, the anode may be prepared as an anode including double active material layers using the first anode active material composition and the second anode active material composition.

Next, a separator to be inserted between the anode and the cathode is prepared.

As the separator, any separator may be used as long as it is commonly used in a lithium battery. A separator having low resistance to the movement of ions in the electrolyte and superior in electrolyte wettability may be used. For example, the separator may include any one selected from glass fiber, polyester, Teflon, polyethylene, polypropylene, polytetrafluoroethylene (PTFE), and combinations thereof, and may be made in the form of nonwoven fabric or woven fabric. For example, a windable separator including polyethylene, polypropylene, or the like may be used in a lithium ion battery, and a separator having good electrolyte impregnation ability may be used in a lithium ion polymer battery. For example, the separator may be manufactured by the following method.

A polymer resin, a filler, and a solvent are mixed to prepare a separator composition. The separator composition is directly applied on an electrode and dried to form a separator. Alternatively, the separator composition is cast on a support and dried, a separation film is separated from the support, and then the separation film is laminated on the electrode to form a separator.

The polymer resin used in the manufacture of the separator is not limited, and any material may be used as long as it may be used in a binder of an electrode plate. For example, as the polymer resin, a vinylidene fluoride/hexafluoropropylene copolymer, polyvinylidene fluoride (PVDF), polyacrylonitrile, polymethyl methacrylate, or a mixture thereof may be used.

Next, an electrolyte is prepared.

For example, the electrolyte may be an organic electrolyte. The electrolyte may be a solid electrolyte. For example, the solid electrolyte may be boron oxide, lithium oxynitride, or the like, but is not limited thereto. Any solid electrolyte may be used as long as it may be used in the art. The solid electrolyte may be formed on the cathode by sputtering or the like.

For example, the organic electrolyte may be prepared by dissolving lithium salt in an organic solvent.

As the organic solvent, any organic solvent may be used as long as it may be used in the art. For example, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl iso propyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N, N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, or a mixture thereof.

As the lithium salt, any lithium salt may be used as long as it may be used in the art. For example, the lithium salt may be LiPFe, $LiBF_4$, LiSbFe, LiAsFe, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (here, x and y are natural number), LiCl, LiI, or a mixture thereof.

Figure 5:
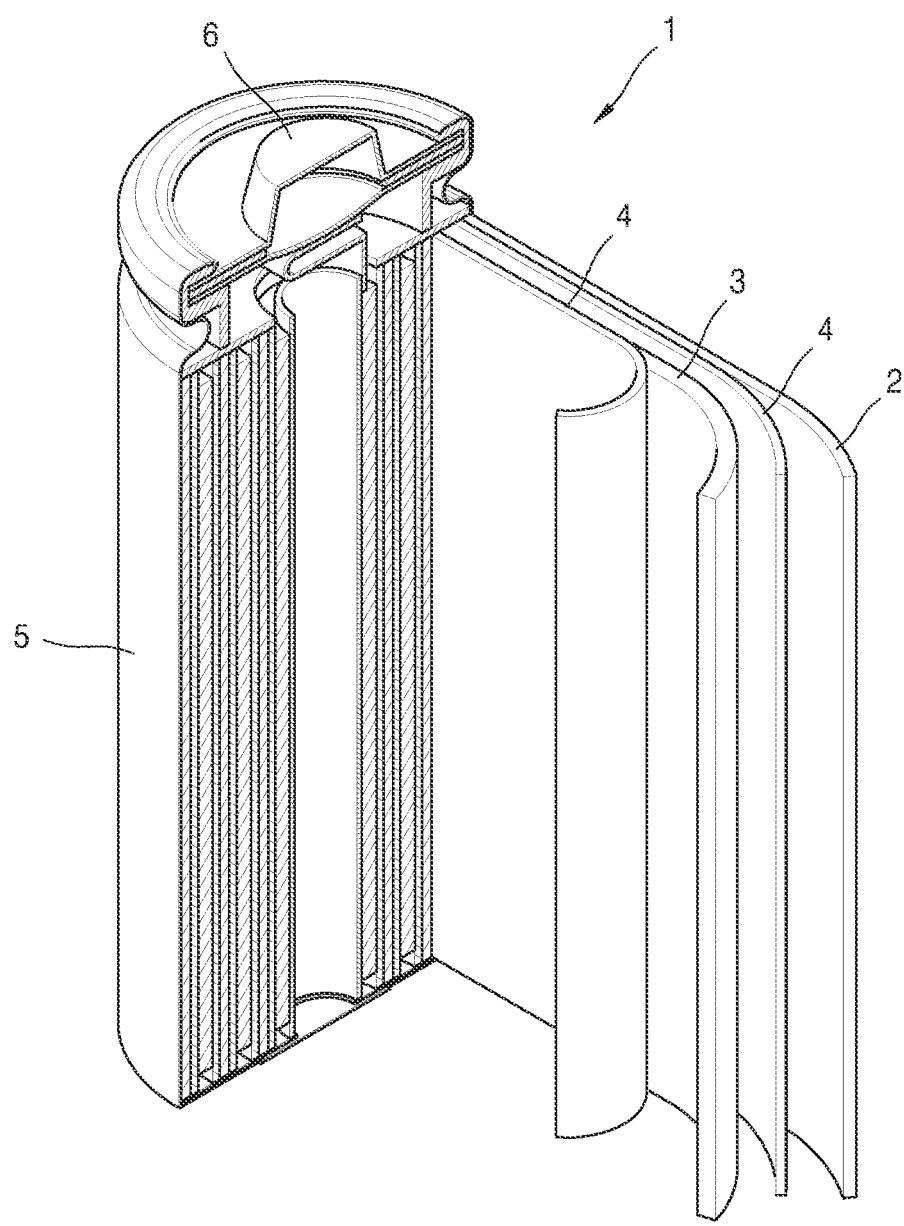
FIG. 5 is a schematic view showing a structure of a lithium secondary battery according to an embodiment.

As shown in FIG. 5, the lithium secondary battery 1 includes a cathode 3, an anode 2, and a separator 4. The anode 3, the cathode 2, and the separator 4 are wound or folded and accommodated in a battery case 5. Then, an organic electrolyte is injected into the battery case 5, and the battery case 5 is sealed with a cap assembly 6 to complete the manufacture of the lithium secondary battery 1. The battery case 5 may have a cylindrical shape, a rectangular shape, or a thin film shape. For example, the lithium secondary battery 1 may be a thin-film battery. The lithium secondary battery 1 may be a lithium-ion battery.

The separator 4 may be located between the anode 3 and the cathode 2 to form a battery structure. The battery structure is laminated as a bi-cell structure and then impregnated with an organic electrolyte, and the resulting product is accommodated in a pouch and sealed to complete a lithium-ion polymer battery.

Further, the plurality of battery structures are laminated to form a battery pack, and this battery pack may be used in all appliances requiring high capacity and high power. For example, the battery pack may be used in notebooks, smart phones, electric vehicles, and the like.

The lithium secondary battery may be used in an electric vehicle (EV) because of its excellent life characteristics and high-rate characteristics. For example, the lithium secondary battery may be used in hybrid vehicles such as plug-in hybrid electric vehicles (PHEV). Further, the lithium secondary battery may be used in applications where a large amount of power storage is required. For example, the lithium secondary battery may be used in electric bicycles, power tools, and the like.

Hereinafter, the present disclosure will be described in more detail with reference to Examples and Comparative Examples. However, these Examples are for illustrating the present disclosure, and the scope of the present disclosure is not limited thereto.

EXAMPLES (Evaluation of Limitation of Total Content of Binder in Slurry)

Example 1

(Preparation of First Active Material Slurry)

Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer). Then, 0.6 wt % of styrene-butadiene rubber (SBR), as a binder, was put into the mechanical stirrer, and stirred for 10 minutes to prepare a first active material slurry.

(Preparation of Second Active Material Slurry)

Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer). Then, 1.4 wt % of styrene-butadiene rubber (SBR), as a binder, was put into the mechanical stirrer, and stirred for 10 minutes to prepare a second active material slurry.

(Manufacture of Electrode)

The second active material slurry was applied onto a copper current collector having a thickness of 10 μm to a thickness of about 75 μm using a doctor blade, dried at 110° C. for 10 minutes using a hot air dryer to form a second active material layer, and then the first active material slurry was applied onto the second active material layer to a thickness of about 75 μm using a doctor blade, dried at 110° C. for 10 minutes using a hot air dryer, and roll-pressed to prepare an anode plate having a density of 1.6 g/cc. In this case, the total content of the binder included in the first active material layer and the second active material layer was 1.0 wt % based on the total weight of the first active material layer and the second active material layer.

Example 2

An electrode was manufactured in the same manner as in Example 1, except that the content of the binder included in the first active material slurry was adjusted to 0.75 wt % and the content of the binder included in the second active material slurry was adjusted to 1.75 wt %, so as to allow the total binder content to be is 1.25 wt %.

Example 3

An electrode was manufactured in the same manner as in Example 1, except that the content of the binder included in the first active material slurry was adjusted to 0.9 wt % and the content of the binder included in the second active material slurry was adjusted to 2.1 wt %, so as to allow the total binder content to be 1.5 wt %.

Example 4

An electrode was manufactured in the same manner as in Example 1, except that the content of the binder included in the first active material slurry was adjusted to 1.02 wt % and the content of the binder included in the second active material slurry was adjusted to 2.38 wt %, so as to allow the total binder content to be 1.7 wt %.

Comparative Example 1

(Preparation of Active Material)

Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer). Then, 1.5 wt % of styrene-butadiene rubber (SBR), as a binder, was put into the mechanical stirrer, and stirred for 10 minutes to prepare an active material slurry.

(Manufacture of Electrode)

The active material slurry was applied onto a copper current collector having a thickness of 10 μm to a thickness of about 150 μm using a doctor blade, dried at 110° C. for 10 minutes using a hot air dryer, and then roll-pressed to prepare an anode plate including a single active material layer having a density of 1.6 g/cc. In this case, the total content of the binder included in the single active material layer was 1.5 wt % based on the total weight of the active material layer.

Comparative Example 2

An electrode was manufactured in the same manner as in Example 1, except that the content of the binder included in the first active material slurry was adjusted to 0.3 wt % and the content of the binder included in the second active material slurry was adjusted to 0.7 wt %, so as to allow the total binder content to be 0.5 wt %.

Comparative Example 3

An electrode was manufactured in the same manner as in Example 1, except that the content of the binder included in the first active material slurry was adjusted to 1.8 wt % and the content of the binder included in the second active material slurry was adjusted to 4.2 wt %, so as to allow the total binder content to be 3.0 wt %.

(Manufacture of Half-Cell of Secondary Battery)

Example 5

The electrode manufactured in Example 1, a lithium metal foil as a counter electrode, and an electrolyte in which LiPFe is dissolved in a mixed solvent of ethylene carbonate (EC), ethylene methylene carbonate (EMC) and dimethyl carbonate (DMC) (volume ratio of EC:EMC:DMC is 2:4:4) to a concentration of 1.15 M were used, and a separator was disposed between the electrodes to manufacture a half-cell.

Examples 6 to 8

Half-cells were manufactured in the same manner as in Example 5, except that the electrodes manufactured in Examples 2 to 4 were used instead of the electrode manufactured in Example 1.

Comparative Examples 4 to 6

Half-cells were manufactured in the same manner as in Example 5, except that the electrodes manufactured in Comparative Examples 1 to 3 were used instead of the electrode manufactured in Example 1.

Evaluation Example 1 (Peel Evaluation)

Figure 2A:
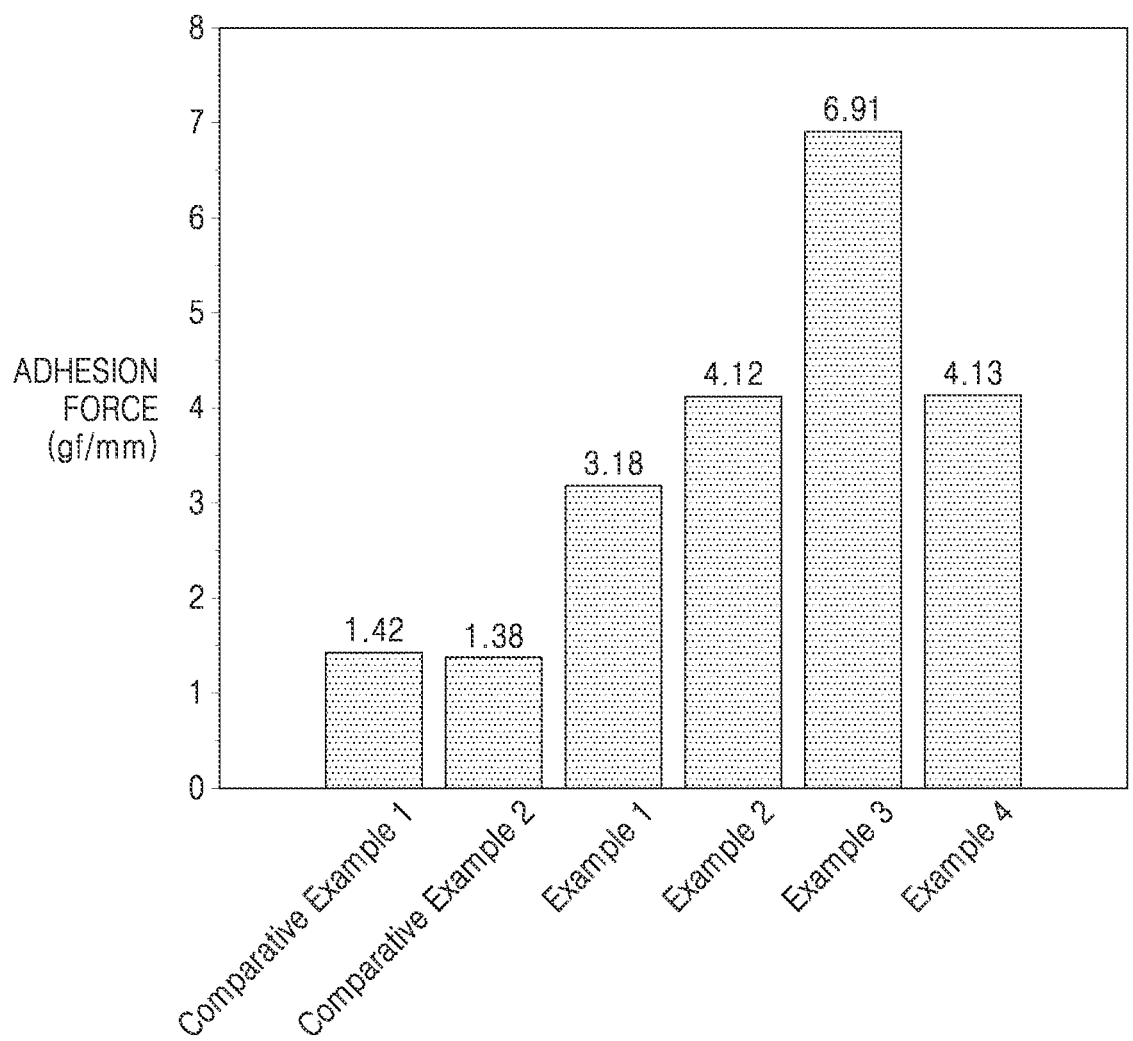
FIG. 2A is a bar graph showing a difference in adhesion force according to the total binder content of the slurry in the electrodes prepared according to Examples 1 to 4 and Comparative Examples 1 to 2.

After cutting the surfaces of the electrodes manufactured in Examples 1 to 4 and Comparative Examples 1 and 2 and fixing them on a slide glass, peel strength was measured at 180 degrees while peeling off the current collector, and the results thereof are shown in FIG. 2A. Referring to FIG. 2A, compared to the electrode of Comparative Example 1 having a single active material layer, the electrode of Example 3 having a double active material layer showed significantly superior adhesion force despite the same total binder content. Further, it was confirmed that the electrodes of Examples 1 to 4 having a total binder content of 1.0 wt % to 1.7 wt % showed excellent adhesion force compared to the electrodes of Comparative Example 2 having a total binder content outside the above range. The adhesion force is considered to be related to the content of the binder of the active material layer (that is, the lower layer) adjacent to the current collector among the double active material layers. When the total binder content is less than 1.0 wt %, the active material layer is not sufficient to have sufficient adhesion force to the current collector, so that separate measurement was omitted.

Evaluation Example 2 (SAICAS Evaluation)

Figure 2B:
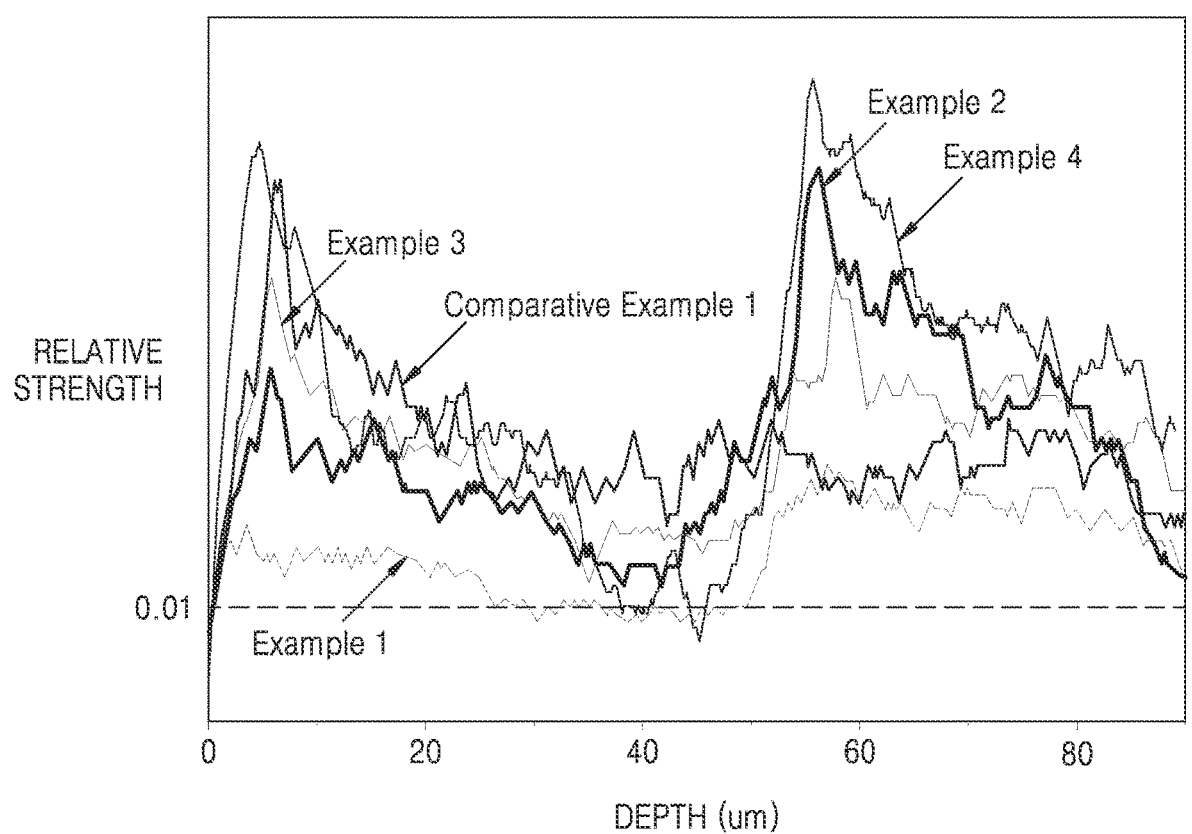
FIG. 2B shows the SAICAS test results in the electrodes prepared according to Examples 1 to 4 and Comparative Example 1.

For the electrodes manufactured in Examples 1 to 4 and Comparative Example 1, the adhesion force of the electrodes according to depth was measured using SAICAS, and the results thereof are shown in FIG. 2B. Referring to FIG. 2b, since it was confirmed that desorption of the active material layer proceeded in the region of 25 to 50 μm in Example 1 in which the total binder content was 1 wt %, it can be seen that the total binder content should be 1 wt % or more.

Evaluation Example 3 (Evaluation of Discharge Control Rate)

After the half-cells manufactured in Examples 5 to 8 and Comparative Example 6 were charged at room temperature under constant current and constant voltage conditions (4.25V, 0.05C cut-off), rest for 10 minutes, and discharged under constant current conditions (0.2C, 0.5C, 0.7C, 1.0C, 1.5C, and 2.0C) until the voltage reached 2.8 V. The discharge rate (%) was calculated based on Equation 1 below, and a graph was obtained as shown in FIG. 2C.

Discharge rate (%)=(discharge capacity when the cell is discharged at a control rate of a specific constant current)/(discharge capacity when the cell is discharged at a rate of 0.2C)×100    [Equation 1]

Figure 2C:
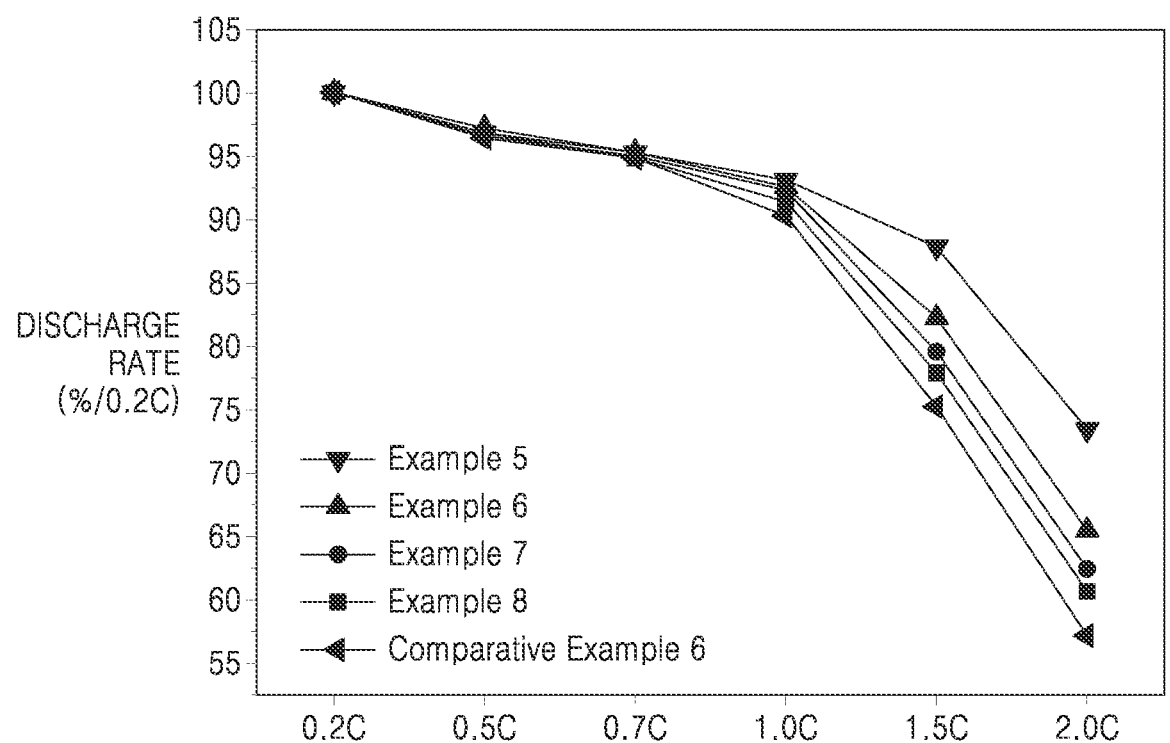
FIG. 2C is a graph showing a change in discharge rate according to a change in control rate in the electrodes prepared according to Examples 5 to 8 and Comparative Example 6.

Referring to the discharge rate graphs of Examples 5 to 8, and Comparative Example 6 shown in FIG. 2c, in Examples 5 to 8 each employing an electrode including a dual active material layer having a total binder content of 1.0 wt % to 1.7 wt %, superior rate characteristics were exhibited compared to Comparative Examples 6 each employing an electrode including a dual active material layer having a total binder content of 3.0 wt %. Further, When the binder content is gradually increased to exceed 1.7 wt % and reach 3.0 wt %, it is considered that the binder content is too high, and the binder acts as a resistance to lithium ions during charging and discharging, thereby reducing the rate characteristics.
(Evaluation of Content of Binder in Each of First Active Material Layer and Second Active Material Layer)

Example 9

(Preparation of First Active Material Slurry)
Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer) to prepare a first active material slurry.
(Preparation of Second Active Material Slurry)
Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer). Then, 3 wt % of styrene-butadiene rubber (SBR), as a binder, was put into the mechanical stirrer, and stirred for 10 minutes to prepare a second active material slurry.

(Manufacture of Electrode)
The second active material slurry was applied onto a copper current collector having a thickness of 10 μm to a thickness of about 75 μm using a doctor blade, and then the first active material slurry was applied onto the second active material layer to a thickness of about 75 μm using a doctor blade, dried at 110° C. for 10 minutes using a hot air dryer, and roll-pressed to prepare an anode plate having a density of 1.6 g/cc. In this case, the total content of the binder included in the first active material layer and the second active material layer was 1.5 wt % based on the total weight of the first active material layer and the second active material layer.

Example 10

An electrode was manufactured in the same manner as in Example 9, except that the binder was added in an amount of 0.6 wt % such that the total binder content is 1.5 wt %, followed by stirring for 10 minutes using a mechanical stirrer to obtain a first active material slurry, and that the content of the binder was adjusted to 2.4 wt %.

Comparative Example 7

An electrode was manufactured in the same manner as in Example 1, except that the content of the binder included in the first active material slurry was adjusted to 1.5 wt % and the content of the binder included in the second active material slurry was adjusted to 1.5 wt %, so as to allow the total binder content to be is 1.5 wt %.

Comparative Example 8

An electrode was manufactured in the same manner as in Example 9, except that the binder was added to the first active material slurry in an amount of 1.5 wt % such that the total binder content is 1.5 wt %, and that the content of the binder included in the second active material slurry was adjusted to 1.5 wt %.

Comparative Example 9

An electrode was manufactured in the same manner as in Example 1, except that the content of the binder included in the first active material slurry was adjusted to 1.8 wt % and the content of the binder included in the second active material slurry was adjusted to 1.2 wt %, so as to allow the total binder content to be is 1.5 wt %.
(Manufacture of Half-Cell of Secondary Battery)

Example 11

The electrode manufactured in Example 9, a lithium metal foil as a counter electrode, and an electrolyte in which $LiPF_6$ is dissolved in a mixed solvent of ethylene carbonate (EC), ethylene methylene carbonate (EMC) and dimethyl carbonate (DMC) (volume ratio of EC:EMC:DMC is 2:4:4) to a concentration of 1.15 M were used, and a separator was disposed between the electrodes to manufacture a half-cell.

Example 12

A half-cell was manufactured in the same manner as in Example 11, except that the electrode manufactured in Example 10 was used instead of the electrode manufactured in Example 9.

Comparative Examples 10 to 12

Half-cells were manufactured in the same manner as in Example 11, except that the electrodes manufactured in Comparative Examples 7 to 9 were used instead of the electrode manufactured in Example 9.

Evaluation Example 4 (Evaluation of Electrode Plate Resistance)

Figure 3A:
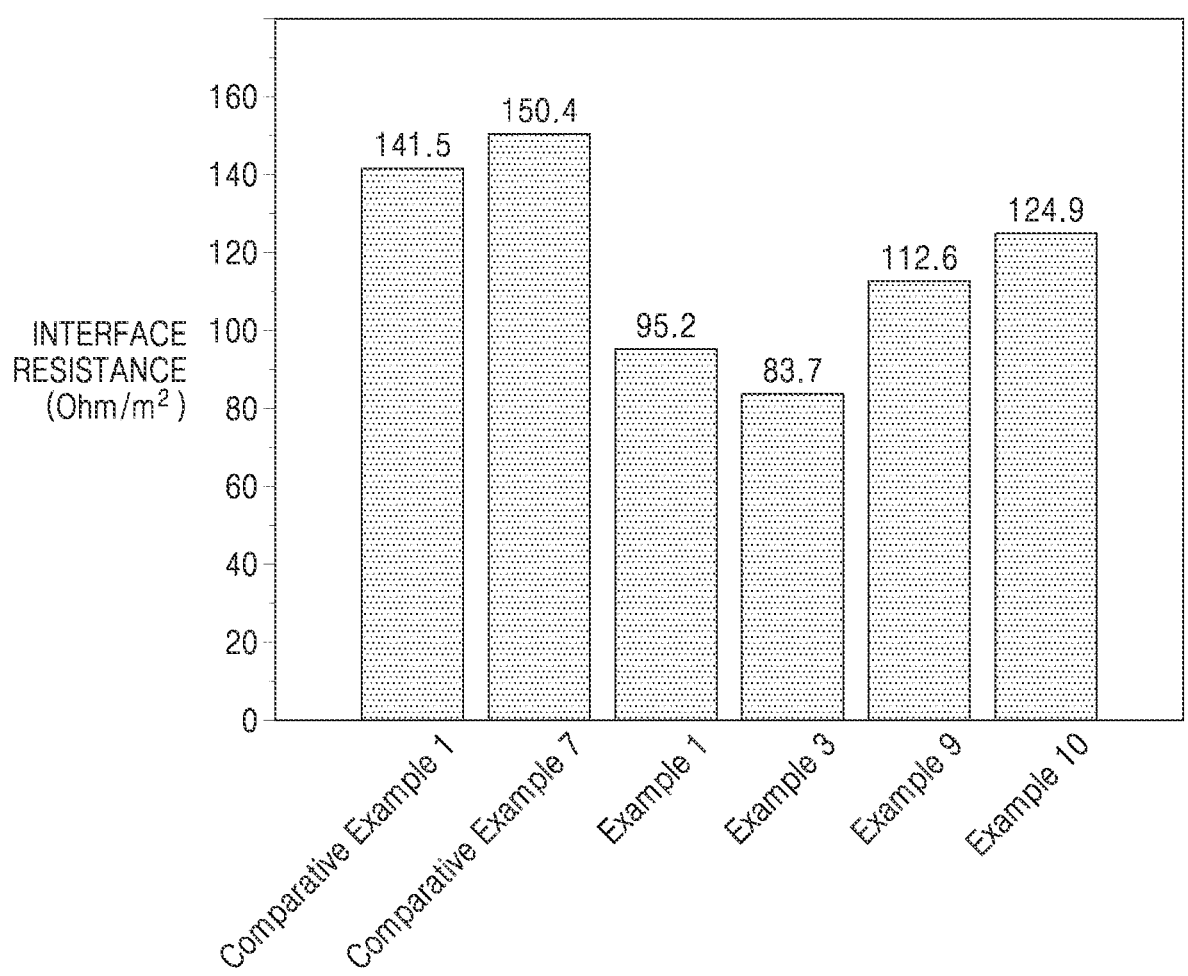
FIG. 3A is a bar graph showing a difference in interfacial resistance according to the binder content of the first active material layer and the second active material layer in the electrodes prepared according to Examples 1, 3, 9, 10 and Comparative Examples 1 and 7.

Resistances of the half-cells manufactured in Examples 1, 3, 9 and 10 and Comparative Examples 1 and 7 were measured using a resistance meter of HIOKI E.E. CORPORATION, and the results thereof are shown in FIG. 3A. Referring to FIG. 3A, it may be confirmed that, as compared with the electrode of Comparative Example 1 including a single active material layer having a binder content of 1.5 wt % and the electrode of Comparative Example 7 including a double active material layer having a binder content ratio of 1:1, the electrode of Example 9 having a binder content ratio of 0:10 (first active material layer: second active material layer), the electrodes of Examples 1 and 3 each including a double active material layer having a binder content ratio of 3:7 (first active material layer: second active material layer), and the electrode of Example 10 including a double active material layer having a binder content ratio of 2:8 (first active material layer second active material layer) had remarkably low resistances. This is considered to be an effect of reducing the distribution of the binder on the surface of the electrode.

Evaluation Example 5 (Evaluation of Half-Cell Resistance)

Figure 3B:
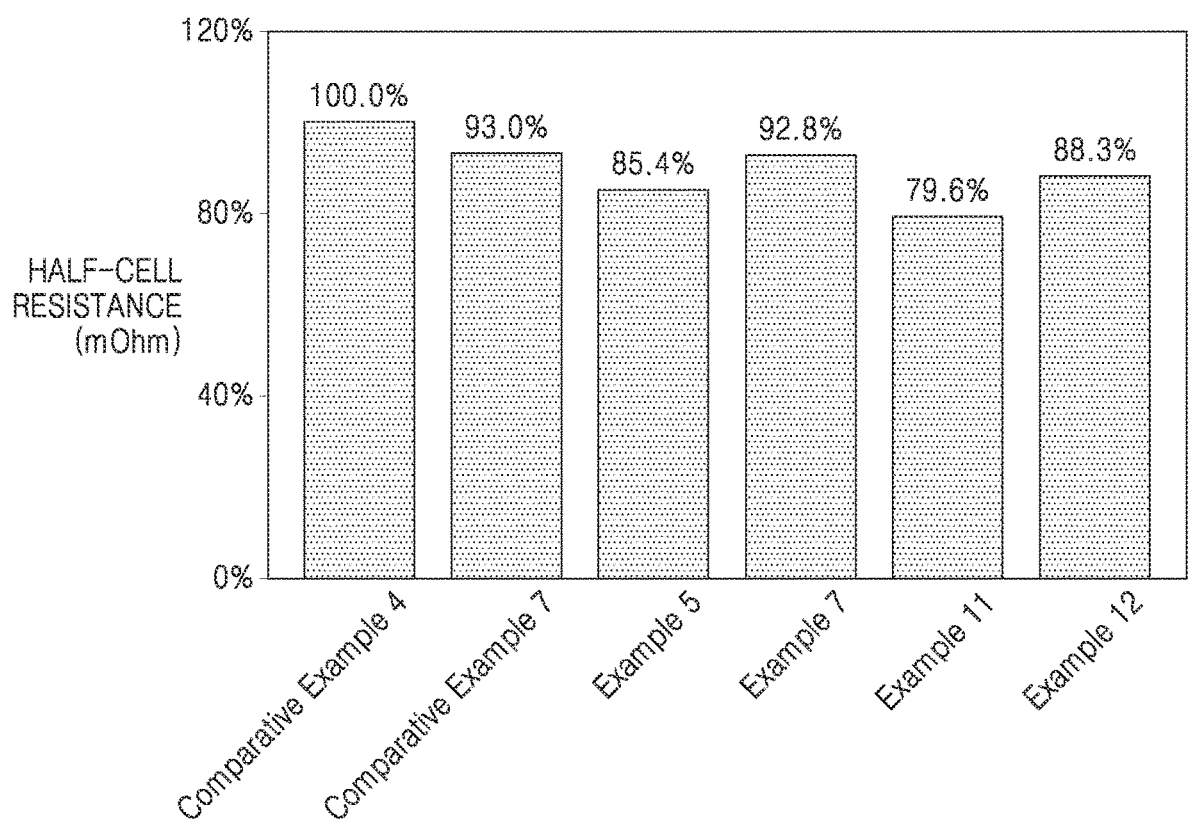
FIG. 3B is a bar graph showing a difference in resistance at the electrode interface in the half-cells manufactured according to Examples 5, 7, 11, and 12 and Comparative Examples 4 and 7.

Interface resistances of the half-cells manufactured in Examples 5, 7, 11 and 12 and Comparative Examples 4 and 7 were measured using a resistance meter of HIOKI E.E. CORPORATION, and the results are shown in FIG. 3B. Referring to FIG. 3B, the half-cell of Comparative Example 4 employing an electrode including a single active material layer having a binder content of 1.5 wt % exhibited higher resistance than Examples 5, 7, 11 and 12 employing a double-layer electrode, and compared to the half-cell of Comparative Example 7 employing a double-layer electrode having a binder content ratio of 1:1, the half-cells of Examples 11, 12, 5, and 7 employing electrodes each having a higher binder content in the second active material layer than in the first active material layer, for example, electrodes each having a binder content ratio of the first active material layer: the second active material layer of 0:10, 2:8, or 3:7 exhibited lower resistance than the half-cell of Comparative Example 7. Therefore, when the binder content of the double layer or the second active material layer is higher than the binder content of the first active material layer, it is expected to exhibit excellent control rate characteristics.

Evaluation Example 6 (Evaluation of Adhesion Force)

Figure 3C:
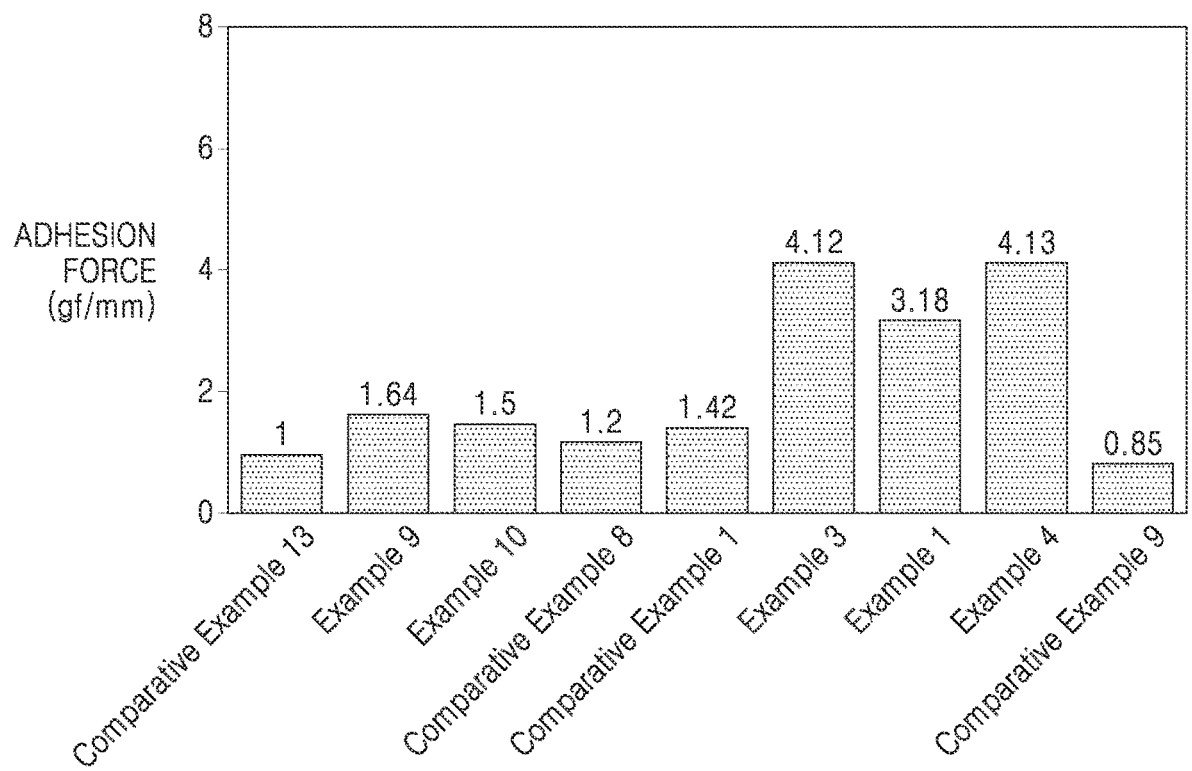
FIG. 3C is a bar graph showing a difference in adhesion force between an active material layer and a current collector according to the binder content in the electrodes manufactured according to Examples 1, 3, 4, 9 and 10 and Comparative Examples 1, 8, 9 and 13.

After cutting the surfaces of the electrodes manufactured in Examples 1, 3, 4, 9 and 10 and Comparative Examples 1, 8, 9 and 13 and fixing them on a slide glass, peel strength was measured at 180 degrees while peeling off the current collector, and the results thereof are shown in FIG. 3C. Referring to FIG. 3C, it may be found that the electrodes each having a double active material layer (Examples 1, 3, 4, 9, 10) has higher adhesion force than the electrode having a single active material layer (Comparative Example 1), may be found that, among the electrodes each having a double active material layer, when the content of the binder contained in the second active material layer is higher than the content of the binder contained in the first active material layer (Examples 1, 3, 4, 9, and 10), excellent adhesion force was exhibited compared to when it is otherwise (Comparative Examples 8 and 9, and may be found that, when the binder ratio of the first active material layer: the second active material layer is 3:7 (Examples 1, 3, and 4), remarkably excellent adhesion was exhibited. This is considered to be because in the case of a single active material layer, the density of the binder at the interface between a current collector and an active material layer is lowered according to binder diffusion, but in the case of an electrode having a double active material layer structure, the binder diffusion is suppressed to increase the density of the binder at the interface between the current collector and the active material layer, and it is easy to control the binder content in the active material layer in contact with the current collector due to the double active material layer structure.

Evaluation Example 7 (Evaluation of Discharge Rate)

After the half-cells manufactured in Examples 5, 7, 11 and 12 and Comparative Examples 4, 11 and 12 were charged at room temperature under constant current and constant voltage conditions (4.25V, 0.05C cut-off), rest for 10 minutes, and discharged under constant current conditions (0.2C, 0.5C, 0.7C, 1.0C, 1.5C, and 2.0C) until the voltage reached 2.8 V. The discharge rate (%) was calculated based on Equation 1 above, and a graph was obtained as shown in FIG. 3D.

Figure 3D:
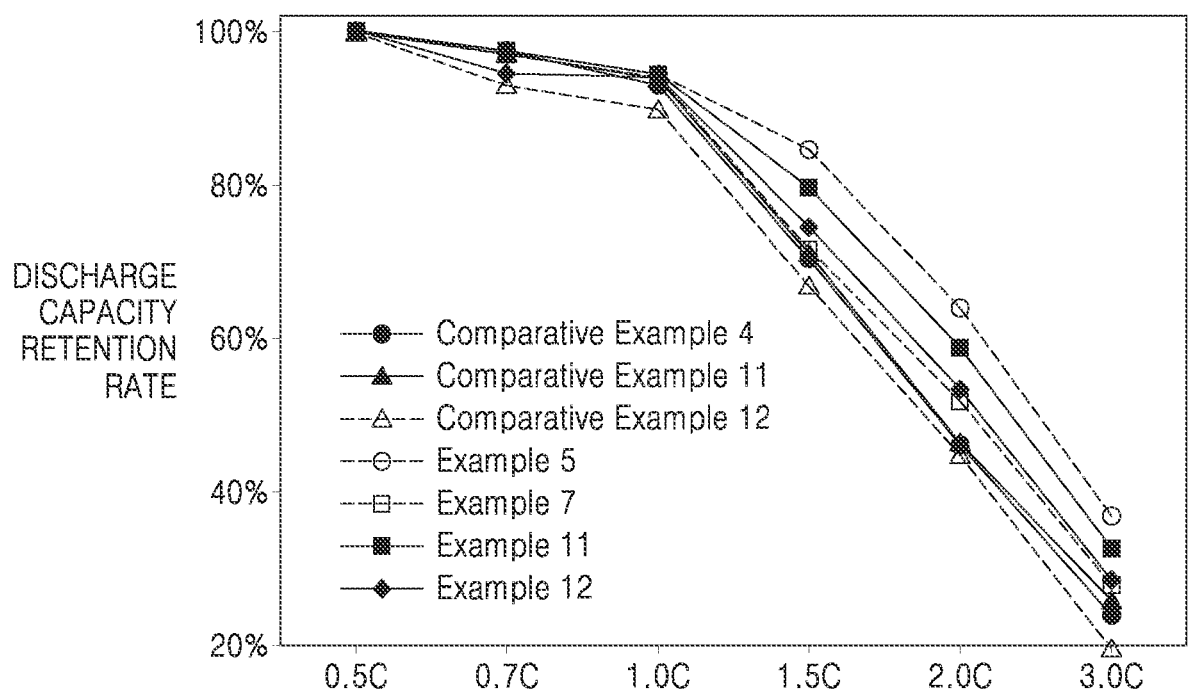
FIG. 3D is a graph showing a change in discharge rate according to a change in control rate in the half-cells manufactured according to Examples 5, 7, 11 and 12 and Comparative Examples 4, 11 and 12.

Referring to the discharge rate graphs of Examples 5, 7, 11 and 12 and Comparative Examples 4, 11 and 13 shown in FIG. 3D, it may be found that Examples 5, 7, 11 and 12 exhibit excellent capacity retention rates compared to Comparative Examples 4, 11 and 12 at a charge/discharge rate exceeding 1.0 C (for example, 1.5 C to 3.0 C). This illustrates that when the active material layer is configured as a double layer, not a single layer, high-speed charging and discharging is advantageous due to a decrease in interfacial resistance due to binder diffusion. Further, it may be found that when the content of the binder contained in the upper layer (the first active material layer) is higher than the content of the binder contained in the lower layer (the second active material layer), the resistance at the electrode interface in contact with the electrolyte was increased, and the high-speed charge/discharge characteristics were deteriorated due to an increase in resistance at the electrode interface in contact with an electrolyte.

(Evaluation of Thickness Ratio of First Active Material Layer/Second Active Material Layer)

Example 13

(Preparation of First Active Material Slurry)

Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer). Then, 0.9 wt % of styrene-butadiene rubber (SBR), as a binder, was put into the mechanical stirrer, and stirred for 10 minutes to prepare a first active material slurry.

(Preparation of Second Active Material Slurry)

Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer). Then, 2.1 wt % of styrene-butadiene rubber (SBR), as a binder, was put into the mechanical stirrer, and stirred for 10 minutes to prepare a second active material slurry.

(Manufacture of Electrode)

The second active material slurry was applied onto a copper current collector having a thickness of 10 μm to a thickness of about 75 μm using a doctor blade, dried at 110° C. for 10 minutes using a hot air dryer to form a second active material layer, and then the first active material slurry was applied onto the second active material layer using a doctor blade, dried at 110° C. for 10 minutes using a hot air dryer to form a first active material layer having a thickness of about 105 μm, followed by roll-pressing to prepare an anode plate having a density of 1.6 g/cc. In this case, the thickness ratio of the first active material layer and the second active material layer is 7:3, and the total content of the binder included in the first active material layer and the second active material layer was 1.5 wt % based on the total weight of the first active material layer and the second active material layer.

Example 14

An electrode was manufactured in the same manner as in Example 13, except that the first active material slurry and the second active material slurry are applied such that the thickness ratio of the first active material layer and the second active material layer is 1:1.

Comparative Example 13

An electrode was manufactured in the same manner as in Example 13, except that the first active material slurry and the second active material slurry are applied such that the thickness ratio of the first active material layer and the second active material layer is 3:7.

(Manufacture of Half-Cell)

Example 15

The electrode manufactured in Example 13, a lithium metal foil as a counter electrode, and an electrolyte in which LiPF6 is dissolved in a mixed solvent of ethylene carbonate (EC), ethylene methylene carbonate (EMC) and dimethyl carbonate (DMC) (volume ratio of EC:EMC:DMC is 2:4:4) to a concentration of 1.15 M were used, and a separator was disposed between the electrodes to manufacture a half-cell.

Example 16

A half-cell was manufactured in the same manner as in Example 15, except that the electrode manufactured in Example 14 was used instead of the electrode manufactured in Example 13.

Comparative Example 14

A half-cell was manufactured in the same manner as in Example 15, except that the electrode manufactured in Comparative Example 13 was used instead of the electrode manufactured in Example 13.

Evaluation Example 8 (Evaluation of Discharge Control Rate)

After the half-cells manufactured in Examples 15 and 16 and Comparative Example 14 were charged at room temperature under constant current and constant voltage conditions (4.25V, 0.05C cut-off), rest for 10 minutes, and discharged under constant current conditions (0.2C, 0.5C, 0.7C, 1.0C, 1.5C, and 2.0C) until the voltage reached 2.8 V. The discharge rate (%) was calculated based on Equation 1 above, and a graph was obtained as shown in FIG. 3D.

Figure 4:
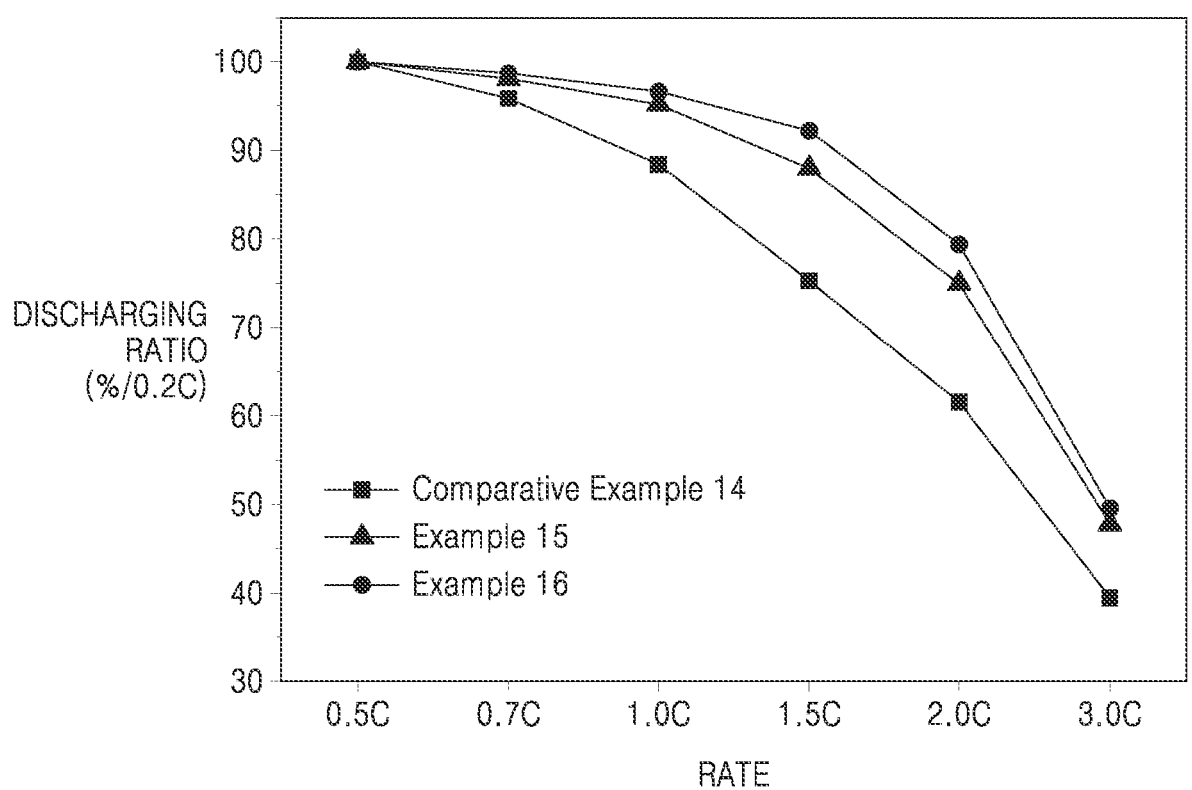
FIG. 4 is a graph showing a change in discharge rate according to a change in control rate in the half-cells manufactured according to Examples 15 and 16 and Comparative Examples 14.

Referring to the discharge rate graphs of Examples 15 and 16 and Comparative Example 14 shown in FIG. 4, it may be found that Examples 15 and 16 (thickness ratio of the first active material layer and the second active material layer is 7:3 to 5:5) exhibit excellent control rate characteristics at individually discharge rates compared to Comparative Example 14 (the thickness ratio of the first active material layer and the second active material layer was 3:7). Since the starting point of binder diffusion from the active material layer to the electrode surface may be farther away as the thickness of the second active material layer is smaller than the thickness of the first active material layer, it is thought that the distribution ratio of the binder on the surface is lowered, and as a result, the resistance by the binder is lowered, so that excellent high-rate characteristics are exhibited. Further, considering that a larger amount of binder is included in the second active material layer when the thickness of the second active material layer is greater than that of the first active material layer, the layer having high porosity becomes thick, and as a result, resistance increases, and cell characteristics deteriorate.

Table 1 below summarizes the total binder amount, content ratio, and thickness ratio of the above-described electrodes of Examples and Comparative Examples.

TABLE 1

| Electrode | Total binder amount (wt %) | Weight ratio of first active material layer: second active material layer | Thickness ratio of first active material layer: second active material layer |
|---|---|---|---|
| Example 1 | 1.0 | 3:7 | 1:1 |
| Example 2 | 1.25 | 3:7 | 1:1 |
| Example 3 | 1.5 | 3:7 | 1:1 |
| Example 4 | 1.7 | 3:7 | 1:1 |
| Example 9 | 1.5 | 0:10 | 1:1 |
| Example 10 | 1.5 | 3:7 | 1:1 |
| Example 13 | 1.5 | 3:7 | 7:3 |
| Example 14 | 1.5 | 3:7 | 1:1 |
| Comparative Example 1 | 1.5 | Single layer | Single layer |
| Comparative Example 2 | 0.5 | 3:7 | 1:1 |
| Comparative Example 3 | 3.0 | 3:7 | 1:1 |
| Comparative Example 7 | 1.5 | 5:5 | 1:1 |
| Comparative Example 8 | 1.5 | 5:5 | 1:1 |
| Comparative Example 9 | 1.5 | 6:4 | 1:1 |
| Comparative Example 13 | 1.5 | 3:7 | 3:7 |

Heretofore, preferred embodiments according to the present disclosure have been described with reference to the drawings and examples, but it will be understood that this is only an example, and various modifications and equivalent other embodiments are possible therefrom by those of ordinary skill in the art. Accordingly, the protection scope of the present disclosure should be defined by the appended claims.

The invention claimed is:

1. An electrode for secondary batteries, the electrode comprising:
   a substrate; and
   a plurality of active material layers arranged on the substrate and each including an active material,
      the plurality of active material layers include a first active material layer and a second active material layer,
   the second active material layer is disposed between the substrate and the first active material layer,
   the first active material layer and the second active material layer include a binder in a weight ratio more than 5:5 and 0:10 or less,
   a thickness ratio of the first active material layer and the second active material layer is 7:3 to 5:5; and
      a content of the binder is 1.0 part by weight to 1.7 parts by weight based on 100 parts by weight of a total weight of the plurality of active material layers.

2. The electrode of claim 1, wherein the binder is non-uniformly distributed in at least one active material layer.

3. The electrode of claim 1, wherein
   the substrate includes a conductive substrate, and
   the binder has a concentration gradient that decreases as a distance from the substrate increases.

4. The electrode of claim 1, wherein the first active material layer and the second active material layer include a binder in a weight ratio of more than 5:5 and 1:9 or less.

5. The electrode of claim 1, wherein a content of the binder is 1 part by weight to 3 parts by weight based on 100 parts by weight of a total weight of the second active material layer.

6. The electrode of claim 1, wherein each of thicknesses of the first active material layer and the second active material layer is 60 μm to 210 μm, and thicknesses of the first active material layer and the second active material layer are the same or different.

7. The electrode of claim 1, wherein
   a thickness of the first active material layer is 100 μm to 210 μm, and
   a thickness of the second active material layer is 60 μm to 150 μm.

8. A secondary battery comprising the electrode of claim 1.

* * * * *